March 8, 1949. K. M. LEDERER 2,463,984
FLUSH TYPE RESISTOR ELEMENT FOR
TEMPERATURE MEASUREMENTS
Filed March 18, 1946 2 Sheets-Sheet 1

Inventor:
Karl M. Lederer,
By Pierce & Scheffler,
Attorneys.

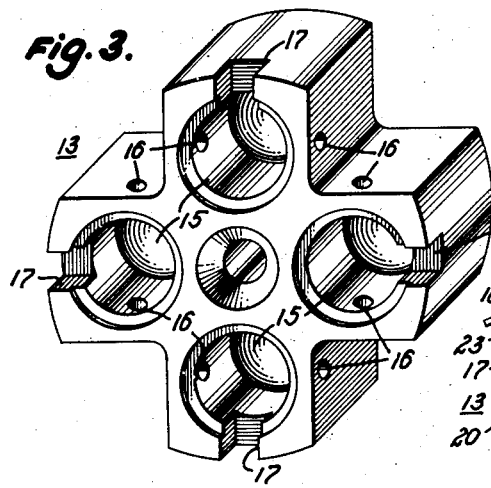
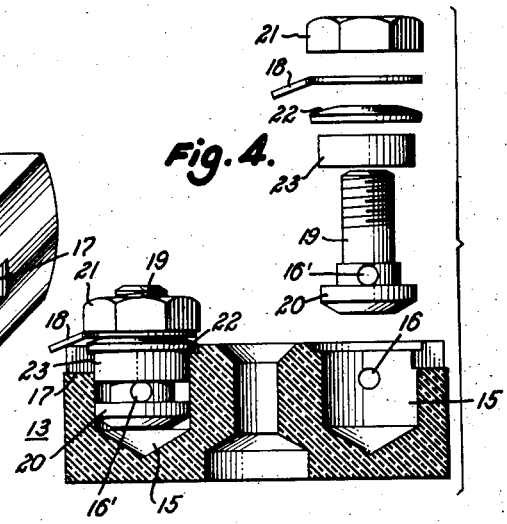
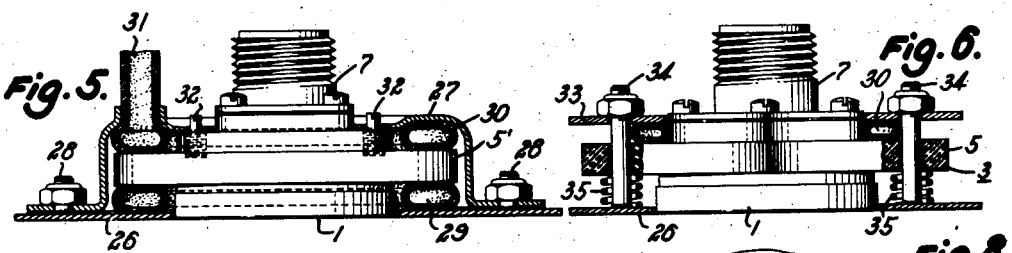
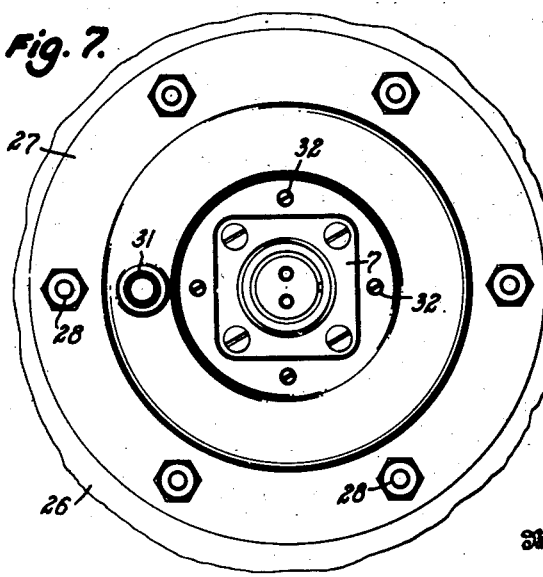
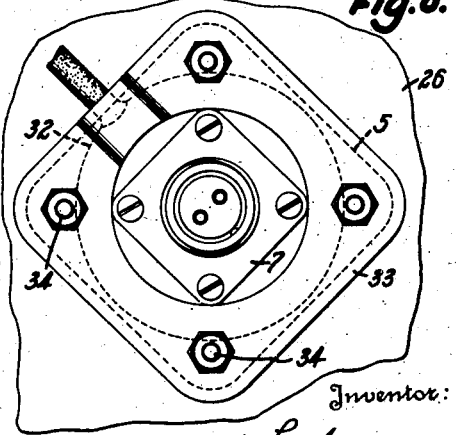

Patented Mar. 8, 1949

2,463,984

UNITED STATES PATENT OFFICE 2,463,984

FLUSH TYPE RESISTOR ELEMENT FOR TEMPERATURE MEASUREMENTS

Karl M. Lederer, Newark, N. J., assignor to Weston Electrical Instrument Corporation, Newark, N. J., a corporation of New Jersey Application March 18, 1946, Serial No. 655,064

9 Claims. (Cl. 201—63)

This invention relates to resistor elements and particularly to resistor elements for use in electrical apparatus for the measurement of temperature.

The usual type of resistor element or resistance bulb is housed within an elongated cylindrical shell of small diameter which may or may not be provided with a mounting head. Such devices are employed on aircraft for the measurement of the "free air" temperature, i. e. the temperature of the air outside of and adjacent the aircraft. The resistor element and/or its supporting structure extended into free air beyond a surface of an airfoil or the fuselage, and such a construction obviously resulted in appreciable wind resistance.

An object is to provide resistor elements for use in temperature measurements, the resistor elements being located within casings having one wall adapted for mounting flush with the outer surface of an airfoil or with the inner wall of a gas or air passage. An object is to provide a resistor element for use in measuring the temperature of air or a fluid, the temperature-variant resistance of the resistor element being a spiral winding, preferably a bifilar winding, cemented to the inner surface of a thin metal sheet which is to be mounted flush with the surface of an airfoil or other wall contacted by the air or fluid. Further objects are to provide resistor elements for location substantially flush with an airfoil surface, and mountings for such resistor elements which are movable to prevent accumulations of ice on the resistance elements.

These and other objects and advantages of the invention will be apparent from the following specification when taken with the accompanying drawing in which:

Fig. 3 is a perspective view of the terminal block on a greatly enlarged scale;

Fig. 4 is a central section through the terminal block, showing the parts of one terminal in position for assembly, and another terminal assembled and in place on the block;

Figure 1:
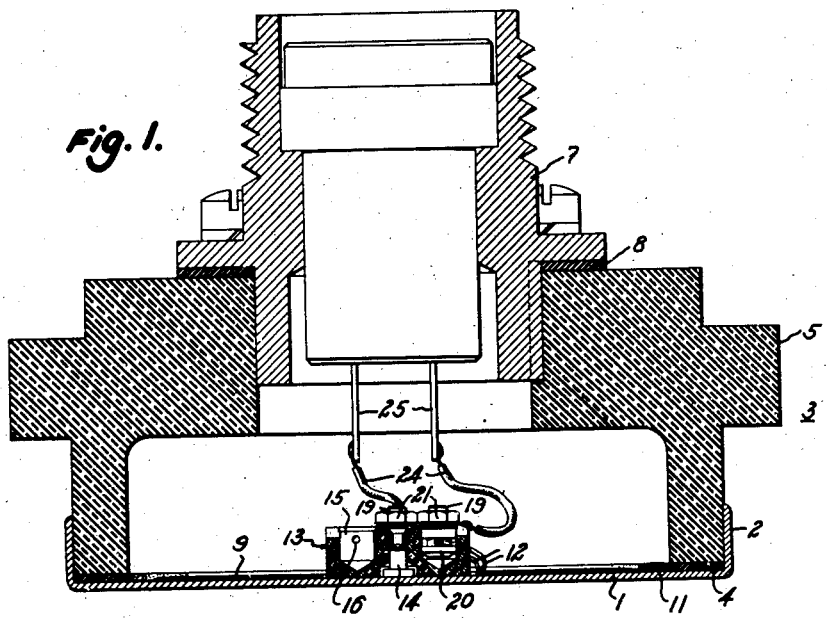
Fig. 1 is an enlarged central section through a resistor element embodying the invention.

Figs. 5 and 6 are smaller scale views, with parts in section, of resistor elements supported in different forms of de-icing mountings; and Figs. 7 and 8 are inside elevations of the de-icing mountings of Figs. 5 and 6, respectively.

In the drawings, the reference numeral 1 identifies a thin metal plate or disk, preferably of stainless steel, which has a shallow rear flange 2 snugly fitted over and secured to the forward end of a small casing 3 of insulating material by cement 4. The casing 3 has an intermediate flange 5 which projects laterally beyond the periphery of the metal plate 1 and has apertures 6 for receiving the screws by which the casing may be mounted on a boundary wall, for example on the interior surface of an airfoil, to locate the metal plate 1 in an opening of the boundary wall and flush with the surface thereof which is contacted by the air or other medium whose temperature is to be measured. A cable connector 7 is secured to the rear of the casing 3, and a gasket 8 between the connector flange and the casing provides a hermetic seal for the interior of the casing.

Figure 2:
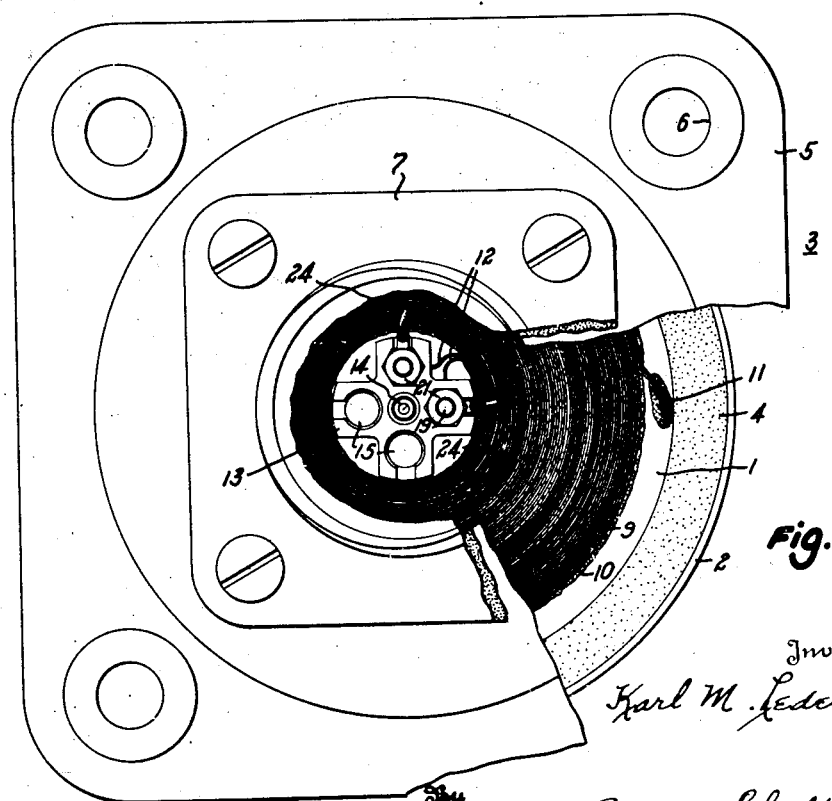
Fig. 2 is a rear or inside elevation of the same with parts broken away to show the resistance winding and terminal connections.

The resistance winding or windings are cemented to the interior surface of the plate 1, and may comprise a single spirally wound coil or the plurality of coils which are conventional in bridge type measuring circuits and in compensated resistor bulb systems. For simplicity of illustration, only a single resistance winding 9 is shown in Figs. 1 and 2. The winding 9 is a spiral coil, and preferably a bifilar coil, of fine enamel-coated copper wire of a diameter of two mils or less which is wound between closely spaced plates in conventional manner and coated with an insulating varnish to form a self-supporting disk which can be removed from the winding form and transferred to the inner surface of the plate 1. The coil 9 is secured to the plate 1 by insulating varnish or cement 10, and the outer ends 11 of the bifilar coil are connected to each other after adjustment of their length to provide a predetermined resistance at a selected temperature of calibration. The coil 9 is of excess length as initially wound and the insulation is removed from the outer ends 11 after the coil is cemented to the plate 1. The bared ends 11 are then twisted together to shorten the effective length of the winding progressively until the measured resistance of the coil is reduced to the preselected value for the temperature at which this calibration is made. Any excess wire length is cut off, and the joined ends 11 are cemented to the plate 1.

The inner ends 12 of the winding 9 are of course secured to terminal connections before this adjustment of the effective length and resistance of the winding. An insulating mounting block 13 for the terminal connectors is secured to the center of the plate 1 by a rivet 14 which has a head welded to the plate 1 and a hollow inner end extending through and staked over the mounting block 13. The mounting blocks 13 could be manufactured in three types to receive two, three or four terminal connectors in accordance with the particular design of the resistance windings and the measuring circuits but it is more economical to use a single "standard" mounting block 13 with four sockets 15 for receiving the required number of terminal connectors for the several types of resistance windings. The block 13 has bores 16 which extend transversely of the sockets 15 to receive an end 12 of a resistance winding, and grooves 17 which lead into the several sockets 15 to receive the projecting ends of soldering lugs 18 of the terminal connectors.

As best shown in Fig. 4, each connector comprises a stud or bolt 19 with an inner head 20 and an outer threaded end for receiving a nut 21 for clamping the soldering lug 18, a spring washer 22 and a washer or bushing 23 upon the end 12 of a winding which is threaded through the bore 16 of the insulating mounting 13 and the transverse opening 16' through the stud 19. After the terminal connector is clamped upon the winding end 12, the connector is secured in place within its socket 15 by wax or varnish. Flexible leads 24 are soldered between the lugs 18 and the terminals 25 of the cable connector 7.

The described flush type of resistor element is well adapted for measurement of the free air temperature at the surface of an airfoil so long as the outer surface of the plate 1 is not covered by ice. The resistor element is preferably mounted for limited movement with respect to the airfoil to crack ice deposits from the plate 1. As shown in Figs. 5 and 7, the resistor assembly is mounted on airfoil 26, and with the plate 1 normally flush with the surface of the airfoil, by means of an annular cap 27 having an outer flange which is secured to studs 28 fixed to the airfoil and an inner flange which extends over the inner face of the housing 3 of the resistor assembly. A hollow ring 29 of rubber or other resilient material is arranged between the airfoil 26 and the radial flange 5' of the housing, and a similar hollow ring 30 is arranged between the rear face of the flange 5' and the inner flange of the cap 27. The flexible ring 30 has an inlet 31 for connection to a source of pulsating pressure air, not shown, which vibrates the resistor housing 3 continuously or intermittently to remove deposits of ice. A plurality of studs 32 are threaded into the housing 3 and extend through the mounting cap 27 to guide the housing for axial movement.

Another form of de-icing mounting, as shown in Figs. 6 and 8, comprises a hollow flexible ring 30 between the flange 5 of the resistor housing 3 and a plate 33 which is mounted on studs 34 secured to the airfoil 26. Coiled compression springs 35 are arranged on the studs 34 between the airfoil 26 and the housing flange 5 to press the flange 5 rearwardly and position the plate 1 flush with the airfoil surface when pressure air is not admitted to the flexible ring 30. The admission of pressure air to the ring 30, either cyclically or manually at intervals, forces the resistor assembly outwardly to crack ice deposits from the surface of the plate 1 to which the resistor winding is secured.

It is to be understood that the invention is not limited to the embodiments herein shown and described as various modifications which may occur to those familiar with the design and construction of resistor elements for temperature measuring systems fall within the spirit and scope of the invention as set forth in the following claims.

I claim:

1. A resistor element for incorporation in a temperature measuring system, said resistor element comprising a metal plate having one surface for engagement by the material whose temperature is to be measured, a closely-wound single layer spiral resistance winding of fine enamel-insulated wire and means adhesively securing said winding to the other surface of said plate.

2. A resistor element as recited in claim 1, in combination with an insulating member secured to said other surface of the plate and substantially centrally of said winding, terminal connectors carried by said insulating member and including means for securing the ends of said winding thereto.

3. A resistor element as recited in claim 1, wherein said winding is a bifilar winding of preselected resistance value at a given temperature, said winding having its outer ends electrically connected to each other at a point which provides said preselected resistance value, in combination with terminal connectors supported on said plate within said spiral resistance winding, the inner ends of said winding being mechanically and electrically connected to said terminal connectors.

4. A resistor element comprising an insulating casing, a metal plate extending across and closing one end of said casing, a resistance winding cemented to the inner surface of said plate, terminal connections for said winding extending through the other end of said casing, and means supporting said terminal connections and sealing said other end of the casing.

5. A resistor element as recited in claim 4 wherein said terminal connections include an insulating block secured to the inner surface of said plate within said winding, and terminal connectors supported on said insulating block; said winding being a bifilar winding with outer ends electrically connected to each other and inner ends connected to said terminal connectors.

6. A resistor element comprising a casing having a metal plate closing one end thereof, a resistance winding cemented to the inner surface of said plate, a boundary wall having an opening therethrough, and means mounting said casing on said boundary wall with said plate in the opening thereof; said mounting means including means for vibrating said casing with respect to said boundary wall.

7. A resistor element comprising a casing having a metal plate closing one end thereof, a resistance winding cemented to the inner surface of said plate, a boundary wall having an opening therethrough, and means mounting said casing on said boundary wall with said plate in the opening thereof; said mounting means including a hollow expansible element for displacing said plate with respect to said boundary wall upon the introduction of a pressure medium into said expansible element.

8. A resistor element comprising a casing with an intermediate flange and having a metal plate closing one end thereof, a resistance winding cemented to the inner surface of said plate, a boundary wall having an opening therethrough, and means mounting said casing on said boundary wall with said plate in the opening thereof; said mounting means including a cap with an outer flange secured to said boundary wall and an inner flange in axial alinement with said intermediate flange, a hollow expansible element between said casing flange and the inner cap flange for displacing said plate with respect to said boundary wall upon the introduction of a pressure medium into said expansible element.

9. A resistor element as recited in claim 8, wherein resilient means is positioned between said boundary wall and said intermediate flange.

KARL M. LEDERER.

REFERENCES CITED

The following references are of record in the file of this patent:

UNITED STATES PATENTS

| Number | Name | Date |
| --- | --- | --- |
| 1,402,889 | Potstada | Jan. 10, 1922 |
| 2,318,102 | Ruge | May 4, 1943 |
| 2,356,858 | Laurence | Aug. 29, 1944 |
| 2,373,255 | McGoldrick | Apr. 10, 1945 |